US009625081B2

(12) United States Patent
Olander

(10) Patent No.: US 9,625,081 B2
(45) Date of Patent: Apr. 18, 2017

(54) STAND FOR SUPPORTING A LAPTOP COMPUTER

(71) Applicant: James D. Olander, Denver, CO (US)

(72) Inventor: James D. Olander, Denver, CO (US)

(*) Notice: Subject to any disclaimer, the term of this patent is extended or adjusted under 35 U.S.C. 154(b) by 0 days.

(21) Appl. No.: 14/068,938

(22) Filed: Oct. 31, 2013

(65) Prior Publication Data

US 2014/0124631 A1 May 8, 2014

Related U.S. Application Data

(60) Provisional application No. 61/722,173, filed on Nov. 4, 2012.

(51) Int. Cl.
*F16M 11/10* (2006.01)
*F16M 11/38* (2006.01)
(Continued)

(52) U.S. Cl.
CPC ............. *F16M 11/10* (2013.01); *F16M 11/38* (2013.01); *F16M 13/00* (2013.01); *A47B 23/043* (2013.01); *A47B 23/06* (2013.01); *A47B 2003/004* (2013.01); *A47B 2023/049* (2013.01); *A47C 4/286* (2013.01); *F16M 2200/061* (2013.01)

(58) Field of Classification Search
CPC .. A47B 3/08; A47B 3/002; A47B 3/00; A47B 3/087; A47B 2003/004; A47B 23/043; A47B 2023/049; A47B 23/06; B25H 1/04; B25H 1/02; A47C 4/045; A47C 9/10; A47C 4/20; A47C 4/286; A47C 19/126; E04H 15/28; B62B 7/068; F16M 11/00; F16M 11/38; F16M 13/00

USPC ....... 248/449, 454, 460, 462, 463, 464, 465, 248/164, 166, 188.6; 108/9, 43, 115, 108/118, 145, 166; 297/16.1, 16.2, 38, 297/42, 44, 56
See application file for complete search history.

(56) References Cited

U.S. PATENT DOCUMENTS 677,216 A * 6/1901 Huebner ........................... 108/4
1,840,620 A * 1/1932 Dennis ........................... 248/462
(Continued)

FOREIGN PATENT DOCUMENTS

CN 201535421 U 7/2010
CN 101701660 A 5/2011
(Continued)

OTHER PUBLICATIONS

International Search Report for International Application No. PCT/US20132/067856, dated Mar. 10, 2014, 14 pages.
(Continued)

*Primary Examiner* — Brian Mattei
*Assistant Examiner* — Taylor Morris
(74) *Attorney, Agent, or Firm* — Dorsey & Whitney LLP

(57) ABSTRACT

A stand for supporting a computing device at an elevated position is provided. The stand may support a laptop computer at a height such that a screen of the laptop computer is at or near eye-level of a user. The stand may include support arms and cross-members attached to the support arms to provide an offset to the support arms. Mounting points may be attached to ends of the support arms. The mounting points may be engageable with a base of the screen of the laptop computer such that a chassis of the laptop computer is suspended from the base of the screen.

12 Claims, 13 Drawing Sheets

(51) Int. Cl.
*F16M 13/00* (2006.01)
*A47B 23/06* (2006.01)
*A47C 4/28* (2006.01)
*A47B 23/04* (2006.01)
*A47B 3/00* (2006.01)

(56) References Cited

U.S. PATENT DOCUMENTS

| | | | |
|---|---|---|---|
| 2,441,932 A | 5/1948 | Curry | |
| 2,722,972 A * | 11/1955 | Altruda | 248/164 |
| 3,899,164 A * | 8/1975 | Newman | 269/71 |
| 3,995,882 A * | 12/1976 | Watkins | B62B 7/068 |
| | | | 280/42 |
| 4,118,065 A * | 10/1978 | Watkins | A47C 4/286 |
| | | | 280/42 |
| 4,714,224 A * | 12/1987 | Calmes | 248/465 |
| 4,726,556 A | 2/1988 | Weir | |
| 5,129,616 A | 7/1992 | Carson | |
| 5,308,035 A * | 5/1994 | Ross | 248/454 |
| 5,833,178 A * | 11/1998 | Plasse et al. | 248/27.8 |
| 6,073,894 A * | 6/2000 | Chen | 248/165 |
| 6,076,787 A | 6/2000 | Troyer | |
| 6,244,011 B1 | 6/2001 | Esser | |
| 6,260,486 B1 | 7/2001 | Boos et al. | |
| 6,382,716 B1 * | 5/2002 | Wu | A47C 4/24 |
| | | | 108/118 |
| 6,634,304 B2 * | 10/2003 | Wang | 108/129 |
| 6,666,223 B2 * | 12/2003 | Price et al. | 135/131 |
| 6,792,880 B2 * | 9/2004 | Tsai | 108/115 |
| 6,944,012 B2 | 9/2005 | Doczy et al. | |
| 7,066,438 B2 * | 6/2006 | Ma | 248/448 |
| 7,229,128 B2 * | 6/2007 | Lee | 297/16.2 |
| 7,712,719 B2 | 5/2010 | Derry et al. | |
| 7,717,502 B2 * | 5/2010 | Deng | A47C 4/20 |
| | | | 297/16.1 |
| 7,748,667 B1 | 7/2010 | Bartholomew | |
| 8,172,191 B1 | 5/2012 | Zimbalatti | |
| 2004/0084581 A1 * | 5/2004 | Chang | 248/166 |
| 2006/0054753 A1 * | 3/2006 | Lee | A47C 4/42 |
| | | | 248/166 |
| 2008/0224515 A1 * | 9/2008 | Cui | A47D 1/02 |
| | | | 297/256.12 |
| 2008/0251659 A1 | 10/2008 | Matias | |
| 2008/0301927 A1 * | 12/2008 | Miller | A47C 7/40 |
| | | | 29/525.01 |
| 2009/0241811 A1 * | 10/2009 | Markegard et al. | 108/118 |
| 2010/0276560 A1 | 11/2010 | Farris-Gilbert et al. | |

FOREIGN PATENT DOCUMENTS

| | | |
|---|---|---|
| CN | 101604187 | 7/2011 |
| CN | 102748568 A | 10/2012 |
| CN | 202691496 | 1/2013 |
| WO | 2009/135402 A1 | 12/2009 |
| WO | 2010040754 A1 | 4/2010 |

OTHER PUBLICATIONS

Furniture Creations, online brochure, http://www.amazon.com/universal-portable-laptop-swivel-cooling/dp/B005VOM5ZI/ref=sr_sp-btf_title_1_6?ie=utf8&qid=1379033418&sr=8-6&keywords=laptop+stand, 4 pages, retrieved on May 8, 2014.
Furinno, online brochure, http://www.amazon.com/Furinno-Adjustable-Laptop-Desk-Multifunctional/dp/B004QXIFCC/ref=sr_1_1?ie=UTF8&qid=1397514675&sr=8-1&keywords=b004qxifcc, 4 pages, retrieved on May 8, 2014.
Herman Miller, online brochure, http://store.hermanmiller.com/Products/Lapjack-Portable-Laptop-Holder, 2 pages, retrieved on May 8, 2014.
Rolodex, online brochure, http://www.amazon.com/Rolodex-82410-Laptop-Stand/dp/B000JE7CMG/ref=sr_sp-atf_title_1_2?ie=UTF8&qid=1379033418&sr=8-2&keywords=laptop+stand, 2 pages, retrieved on Apr. 14, 2014.
Wayback Machine, Human Solutions online brochure, http://web.archive.org/web/20130818085003/http://www.thehumansolution.com/innovative-cricket-portable-laptop-pc-stand.html, 4 pages, retrieved on Apr. 14, 2014.
Wayback Machine, Aidata online brochure, http://web.archive.org/web/20120427184904/http://www.amazon.com/Aidata-LHA-3-LAPstand-Aluminum-Ergonomic/dp/B0016LKWLO, 5 pages, retrieved on Apr. 14, 2014.

* cited by examiner

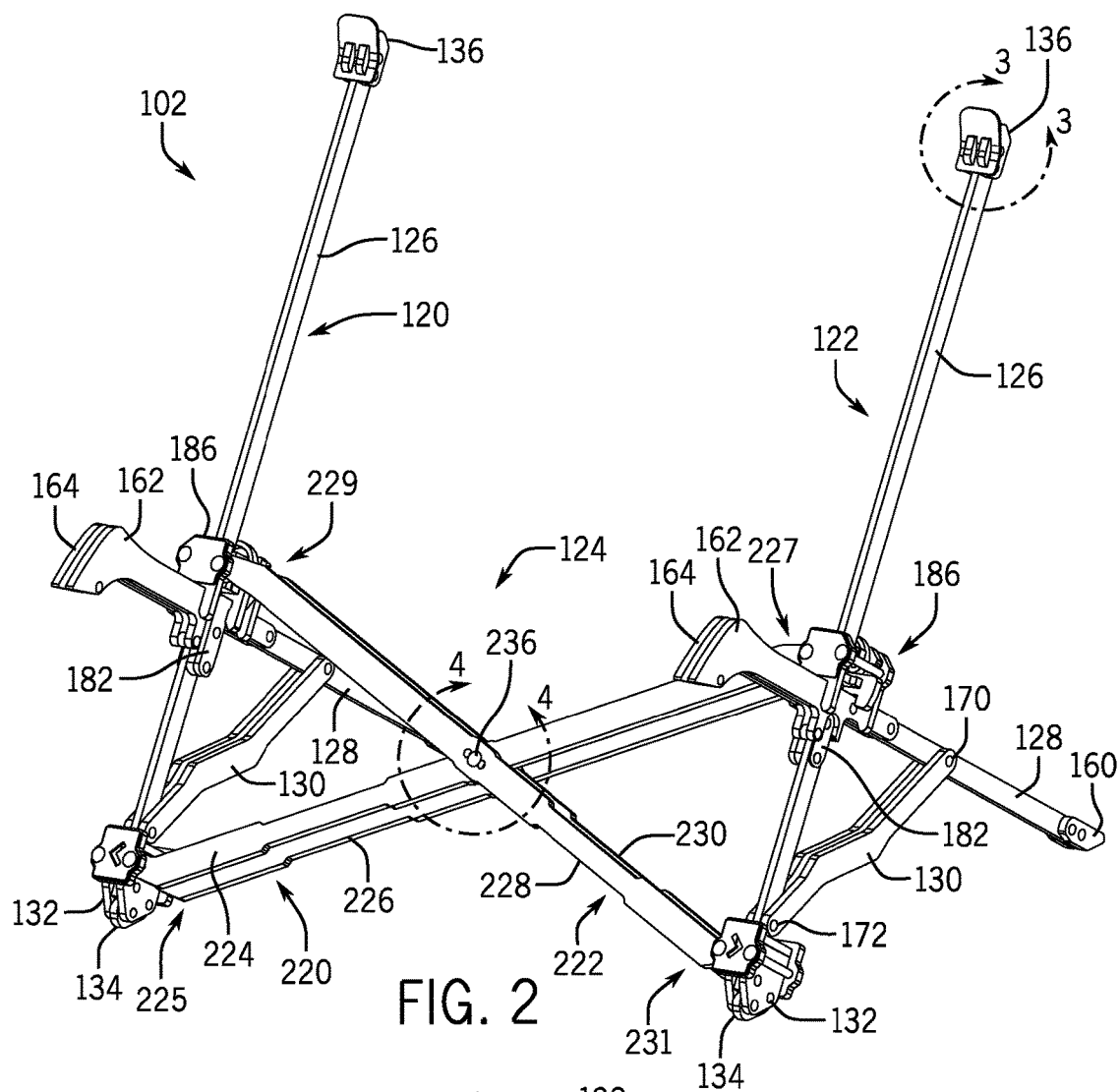
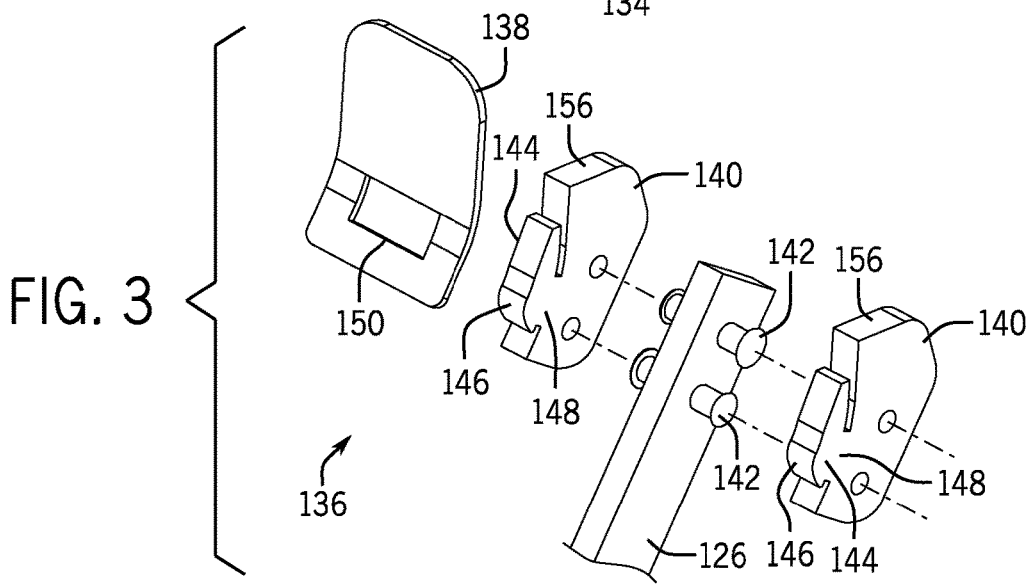

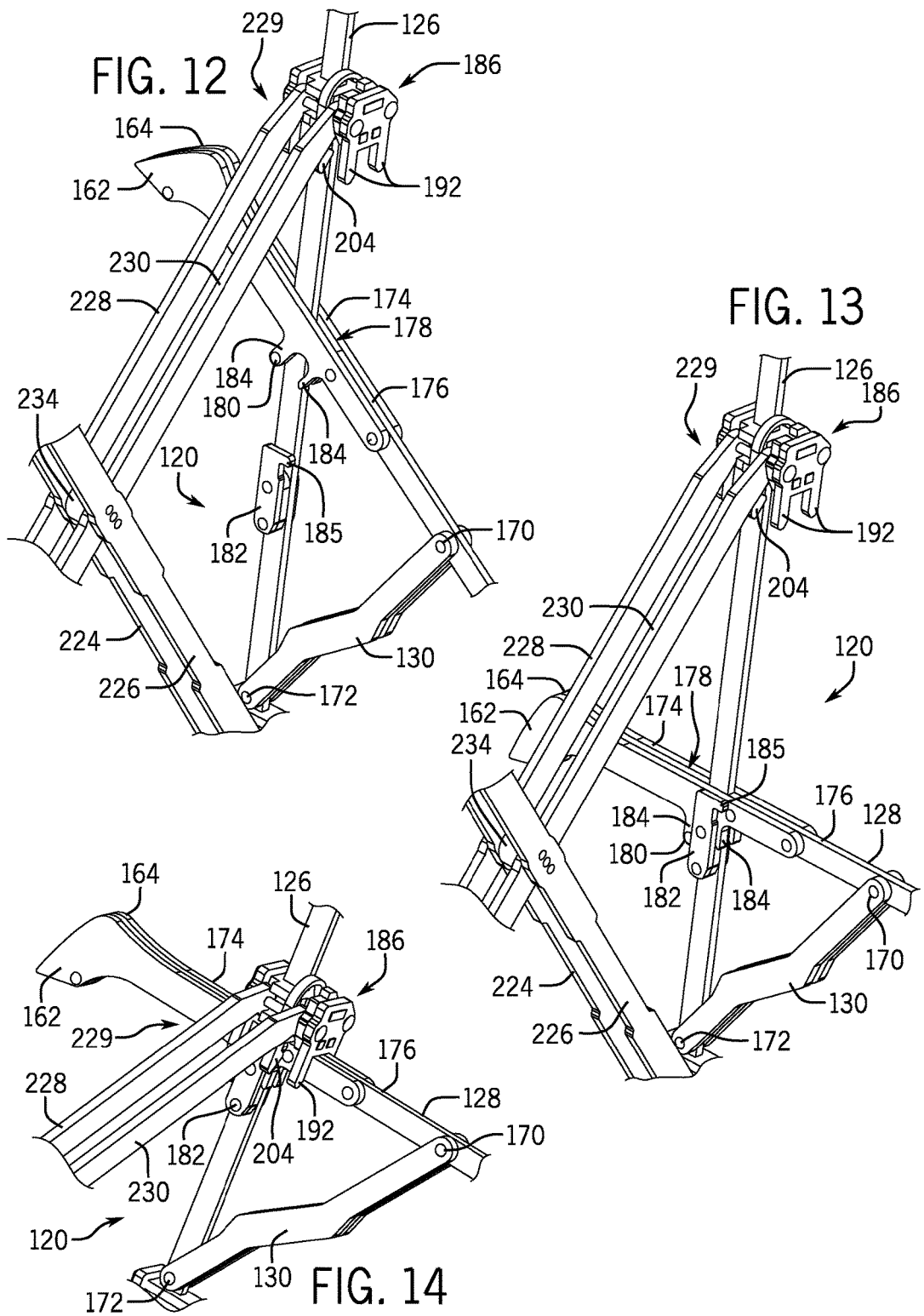

STAND FOR SUPPORTING A LAPTOP COMPUTER

CROSS-REFERENCE TO RELATED APPLICATIONS

This application claims the benefit of U.S. provisional patent application No. 61/722,173, filed Nov. 4, 2012, the entire disclosure of which is hereby incorporated by reference herein.

TECHNICAL FIELD

The present disclosure relates to an accessory for a computing device. More specifically, the present disclosure relates to a stand for supporting a laptop computer.

BACKGROUND

The prevalence of repetitive use injuries from consumer electronics is continually increasing amongst technology users. For example, when situated on a desk or table, a laptop computer has a screen that is positioned typically one to three feet lower than eye level. This positioning arrangement forces a head-down user posture that is dangerous for extended sessions at the laptop computer and contributes greatly to computer-related repetitive use injuries.

SUMMARY

This disclosure relates generally to a stand for positioning a mobile computing device at an elevated position. When used in association with a laptop computer, the stand may elevate a laptop screen to near eye-level so that a user may maintain a more ergonomically-correct working position, thereby reducing repetitive use injuries from using the laptop computer. The stand may be portable, allowing a user to work at remote locations away from their home or office in a more ergonomically-correct working position.

In one example, a stand for supporting a laptop computer having a chassis and a screen may be provided. The stand may include support arms, cross-members attached to the support arms to provide an offset to the support arms, and mounting points attached to ends of the support arms and attachable to a base of the screen such that the chassis is suspended from the base of the screen.

The stand may include legs attached to the support arms. Resting points may be attached to ends of the legs and may be abuttable against the chassis to prevent the chassis from swinging downwardly about the mounting points beyond the resting points. The stand may include sliding mechanisms attached to and slideable along the support arms. The stand may include stoppers attached to the support arms to prevent the sliding mechanisms from sliding beyond the stoppers. The cross-members may be attached to the sliding mechanisms at one end and may be attached to fixed mechanisms at another end to create a scissor mechanism that folds from an extended position into a collapsed position while keeping the support arms parallel or substantially parallel to one another. The stand may include a cross-link attached at one end to a respective support arm and attached at another end to a respective leg. When in an extended position, the legs may form a ninety-degree angle relative to the support arms.

In another example, a stand for supporting a laptop computer at an elevated position above a support surface may be provided. The laptop computer may include a display pivotally coupled to a base by a hinge. The stand may include a frame including one or more display support arms abuttable against a lower edge of the display when the laptop is in an open position such that the one or more display support arms elevate the display above the support surface and the base of the laptop computer is suspended from the display by the hinge.

The one or more display support arms may include a first display support arm and a second display support arm spaced apart from one another. An end portion of the first and second display support arms may extend between the display and the base and may abut against an inner face of the display to restrain movement of the laptop computer relative to the stand. The end portions of the first and second display support arms may abut against opposing end faces of the hinge to restrain lateral movement of the laptop computer relative to the stand. The frame may include a first leg coupled to the first display support arm such that the first leg is rotateable and translateable relative to the first display support arm and a second leg coupled to the second display support arm such that the second leg is rotateable and translateable relative to the second display support arm. The frame may include a first cross-link pivotally coupled to the first leg at one end and to the first display support arm at an opposing end. The frame may include a collapsible cross-frame structure positioned between and coupled to the first and second display support arms.

In another example, a collapsible stand for use with a mobile computing device may be provided. The stand may include a first side-frame structure, a second side-frame structure, and a cross-frame structure positioned between the first and second side-frame structures. The cross-frame structure may be operably coupled to the first and second side-frame structures such that the first and second side-frame structures are oriented parallel or substantially parallel to one another during collapse of the stand from a fully-extended position to a fully-collapsed position.

The cross-frame structure may include a first pair of elongate, offset cross-frame members pivotally attached at a lower end to the first side-frame structure and pivotally attached at an upper end to the second side-frame structure, and a second pair of elongate, offset cross-frame members pivotally attached at an upper end to the first side-frame structure and pivotally attached at a lower end to the second side-frame structure. The first and second pairs of elongate, offset cross-frame members may be pivotally attached to one another intermediate their respective ends.

The upper ends of the first and second pairs of elongate, offset cross-frame members may be slideably attached to the first and second side-frame structures such that the upper ends of the first and second pairs of elongate, offset cross-frame members move away from the lower ends of the first and second pairs of elongate, offset cross-frame members, respectively, during collapse of the stand from the fully-extended position to the fully-collapsed position. When the stand is in the fully-extended position, the upper ends of the first and second pairs of elongate, offset cross-frame members may be lockable to the first and second side-frame structures to prevent or substantially prevent the upper ends of the first and second pairs of elongate, offset cross-frame members from moving relative to the lower ends of the first and second pairs of elongate, offset cross-frame members, respectively.

The first and second side-frame structures each may include an elongate arm and a leg attached to the elongate arm such that the leg rotates and slides relative to the elongate arm. The first and second side-frame structures each may include a cross-link pivotally attached at one end to the elongate arm and pivotally attached at another end to the leg. The first and second side-frame structures each may include a stop attached to the elongate arm to prevent the leg from moving beyond the stop. The leg may intersect the elongate arm at a position between the stop and a respective upper end of the first and second pairs of elongate, offset cross-frame members. The first and second side-frame structures each may include a tab attached to an upper end of the elongate arm. The tab may be removeably attached to the upper end of the elongate arm.

This summary of the disclosure is given to aid understanding, and one of skill in the art will understand that each of the various aspects and features of the disclosure may advantageously be used separately in some instances, or in combination with other aspects and features of the disclosure in other instances. Accordingly, while the disclosure is presented in terms of examples, it should be appreciated that individual aspects or features of any example can be claimed separately or in combination with aspects and features of that example or any other example.

This summary is neither intended nor should it be construed as being representative of the full extent and scope of the present disclosure. The present disclosure is set forth in various levels of detail in this application and no limitation as to the scope of the claimed subject matter is intended by either the inclusion or non-inclusion of elements, components, or the like in this summary.

BRIEF DESCRIPTION OF THE DRAWINGS

The accompanying drawings, which are incorporated in and constitute a part of the specification, illustrate examples of the disclosure and, together with the general description given above and the detailed description given below, serve to explain the principles of these examples.

FIG. 2 is an isometric view of the stand illustrated in FIG. 1.

FIG. 3 is an enlarged, detail view of a display catch feature of the stand illustrated in FIG. 1 taken along line 3-3 as shown in FIG. 2.

FIG. 12 is an enlarged, fragmentary view of a portion of the stand illustrated in FIG. 1 in a first, partially-extended position.

FIG. 13 is an enlarged, fragmentary view of a portion of the stand illustrated in FIG. 1 in a second, partially-extended position.

FIG. 14 is an enlarged, fragmentary view of a portion of the stand illustrated in FIG. 1 in a fully-extended position.

It should be understood that the drawings are not necessarily to scale. In certain instances, details that are not necessary for an understanding of the disclosure or that render other details difficult to perceive may have been omitted. In the appended drawings, similar components and/or features may have the same reference label. It should be understood that the claimed subject matter is not necessarily limited to the particular examples or arrangements illustrated herein.

DETAILED DESCRIPTION

The present disclosure generally describes a stand for use in positioning a computing device, such as a laptop computer, at an elevated position relative to a support surface, such as an upper surface of a desk or table. When used in association with a laptop computer, the stand may position the laptop screen at a height above a support surface such that the screen is at or near eye level of a user. When supported on the stand, the laptop screen may be positioned at a height that is higher than can be achieved if the laptop were to rest by itself on the support surface.

The stand may be attached to the screen, a hinge, or a combination of the screen and hinge of the laptop computer. In some implementations, the stand attaches to a base portion of the screen and the laptop computer is suspended from this attachment point. The attachment point may be higher than the center of mass of the laptop computer, thereby creating an inherently more stable method of holding the laptop computer than traditional "easel" style stands in which the laptop chassis rests on a surface of the stand. In some implementations, the stand engages the hinge of the laptop computer to secure the laptop computer to the stand. As used herein, the laptop screen refers to the entire structure that is hingedly attached to the base or chassis of the laptop computer.

The stand may be collapsible to provide users with a portable stand that may be used in remote locations away from a user's home or office. The portable nature of the stand may allow users to maintain an ergonomically correct working position and minimize repetitive use injuries from computer use while working remotely. The stand may include structural cross-members designed to allow a user to expand or extend the collapsible stand in a single motion and to collapse the stand in a similar, but reverse motion, resulting in an easily packable stand.

Figure 1:
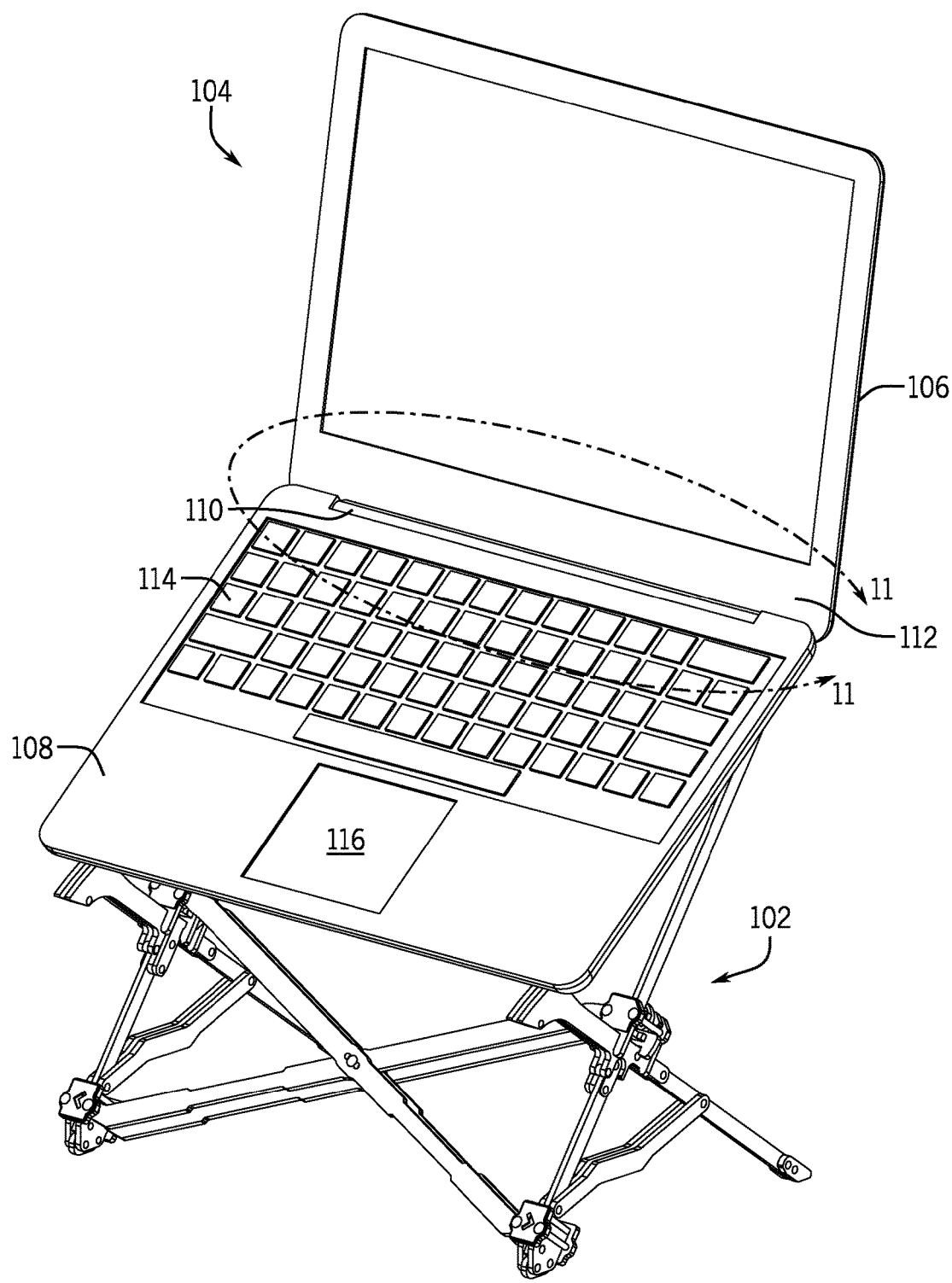
FIG. 1 is a front isometric view of a laptop computer mounted onto an example stand.

FIG. 1 is a front isometric view of an example stand 102 positioning a laptop computer 104 at an elevated position. The laptop computer 104 includes a screen 106 pivotally coupled to a base 108 by a hinge 110. The laptop computer 104 may be supported on the stand 102 in an open position in which the screen 106 is pivoted away from the base 108 such that an inner face 112 of the screen 106 and a keyboard 114 and track pad 116 of the base 108 are visible. The stand 102 may support the screen 106 above a support surface 118 (see FIG. 8), such as an upper surface of a desk or table, such that the screen 106 is near or at an eye level of a user. The stand 102 may be referred to as a computer accessory or a support structure. The screen 106 may be referred to as a display or monitor. The base 108 may be referred to as a chassis.

FIG. 2 is an isometric view of the stand 102 illustrated in FIG. 1. As shown in FIG. 2, the stand 102 may include outside or opposing side-frame structures 120, 122 offset from and attached to one another by a cross-frame structure 124 to create a self-standing support structure. The cross-frame structure 124 may be positioned between the opposing, first and second side-frame structures 120, 122. The cross-frame structure 124 may be operably coupled to the opposing side-frame structures 120, 122 to maintain the side-frame structures 120, 122 in parallel or substantially parallel relationship relative to one another during collapse of the stand 102 from a fully-extended position (see FIGS. 1, 2, 5-8, and 15), through a partially-collapsed position (see FIGS. 18 and 19), and into a fully-collapsed position (see FIG. 20).

Each of the side-frame structures 120, 122 may include an elongate arm 126 and a leg 128 attached to the elongate arm 126 to stabilize the arm 126 in an upwardly-extending position. The side-frame structures 120, 122 may each include a cross-link 130 extending between a respective elongate arm 126 and leg 128. The cross-link 130 may be pivotally attached at one end to a respective elongate arm 126 and pivotally attached at an opposing end to a respective leg 128. The cross-links 130 depicted in FIG. 2 each include two separate, offset pieces that flank opposing sides of a respective elongate arm 126 and leg 128. When the stand 102 is in a fully-collapsed position (see FIG. 20), the elongate arms 126 and the legs 128 may be received in the space defined between the offset pieces of the cross-links 130 to provide a more compact, collapsed stand 102. The elongate arms 126 may be referred to as first and second elongate frame members or display support arms, and the legs 128 may be referred to as third and fourth elongate frame members.

Figure 5:
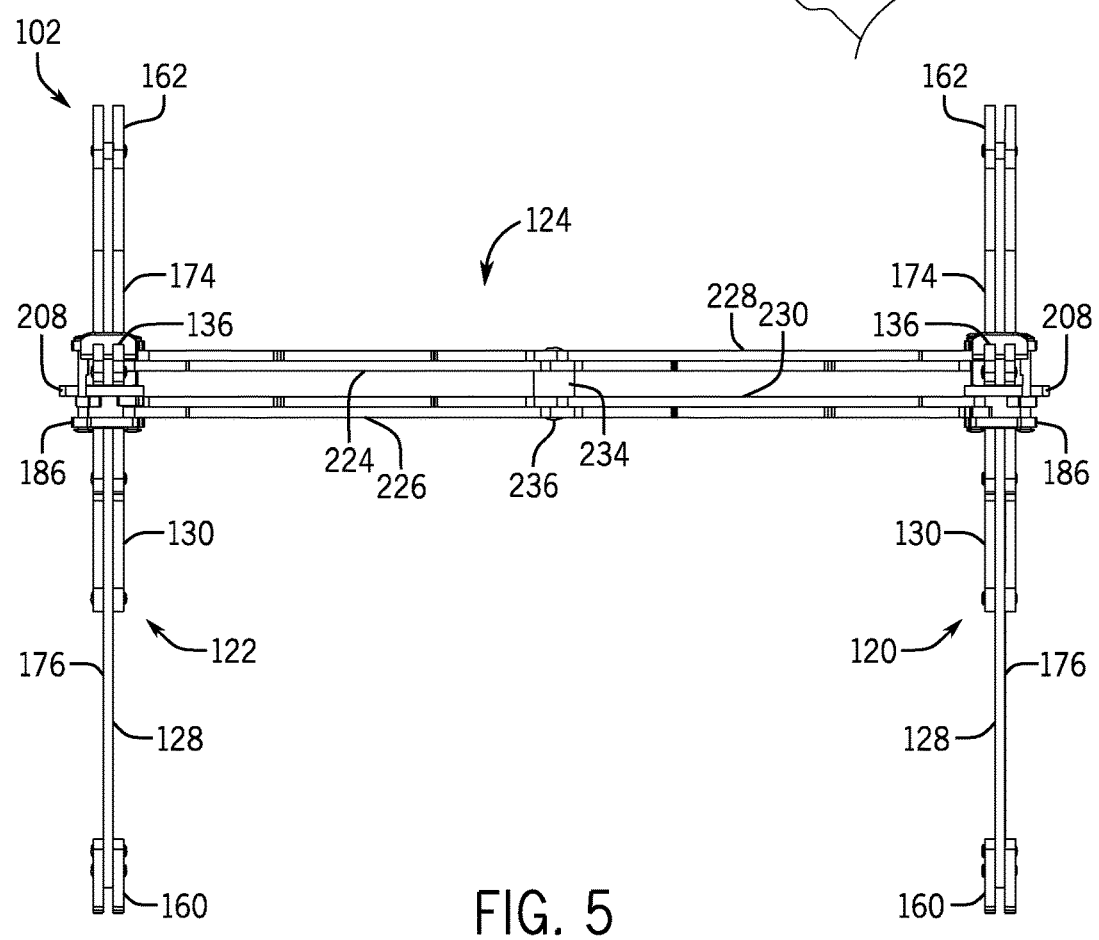
FIG. 5 is a top, rear view of the stand illustrated in FIG. 1 taken along line 5-5 as shown in FIG. 15.
Figure 6:
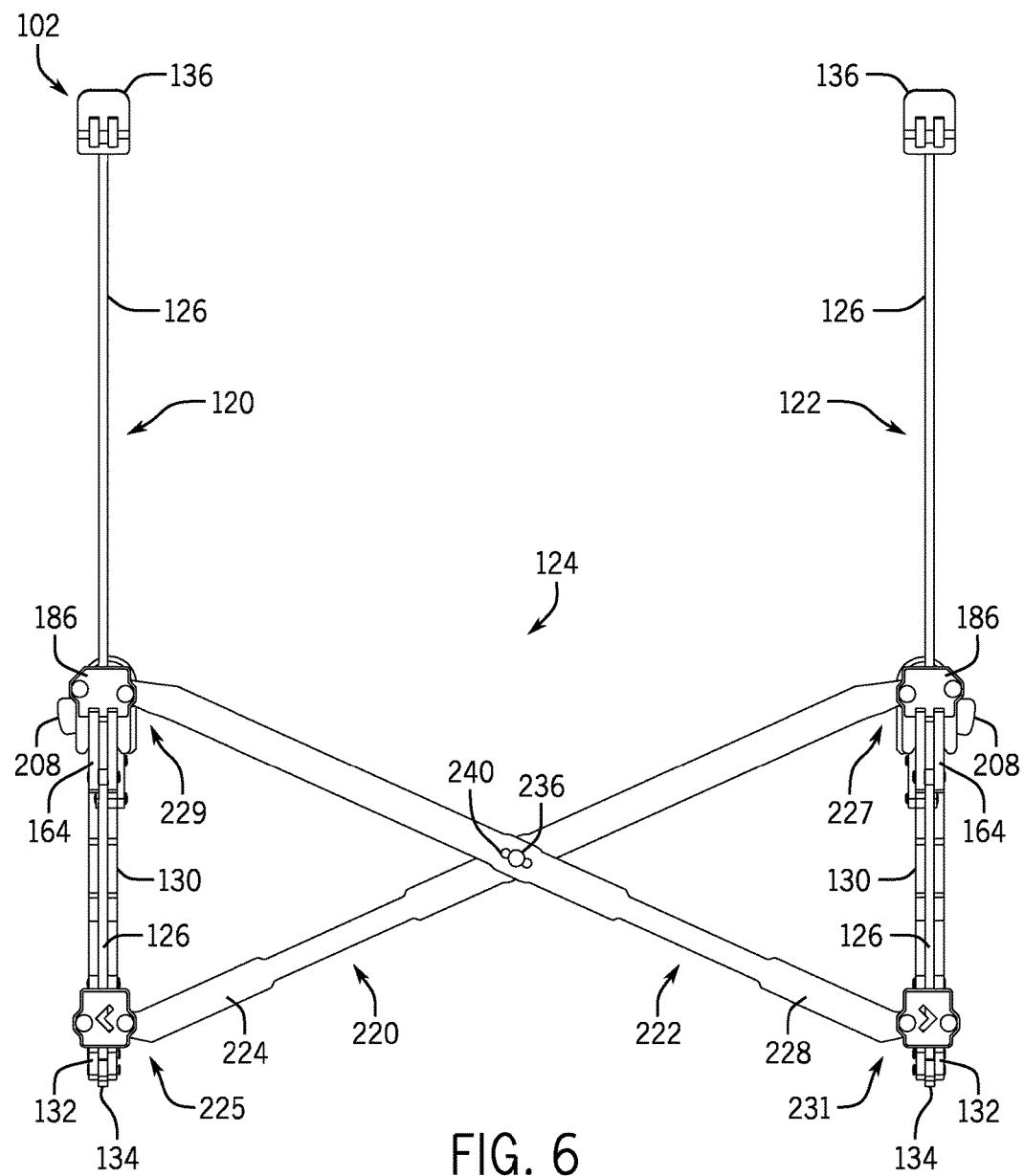
FIG. 6 is a front elevation view of the stand illustrated in FIG. 1.
Figure 7:
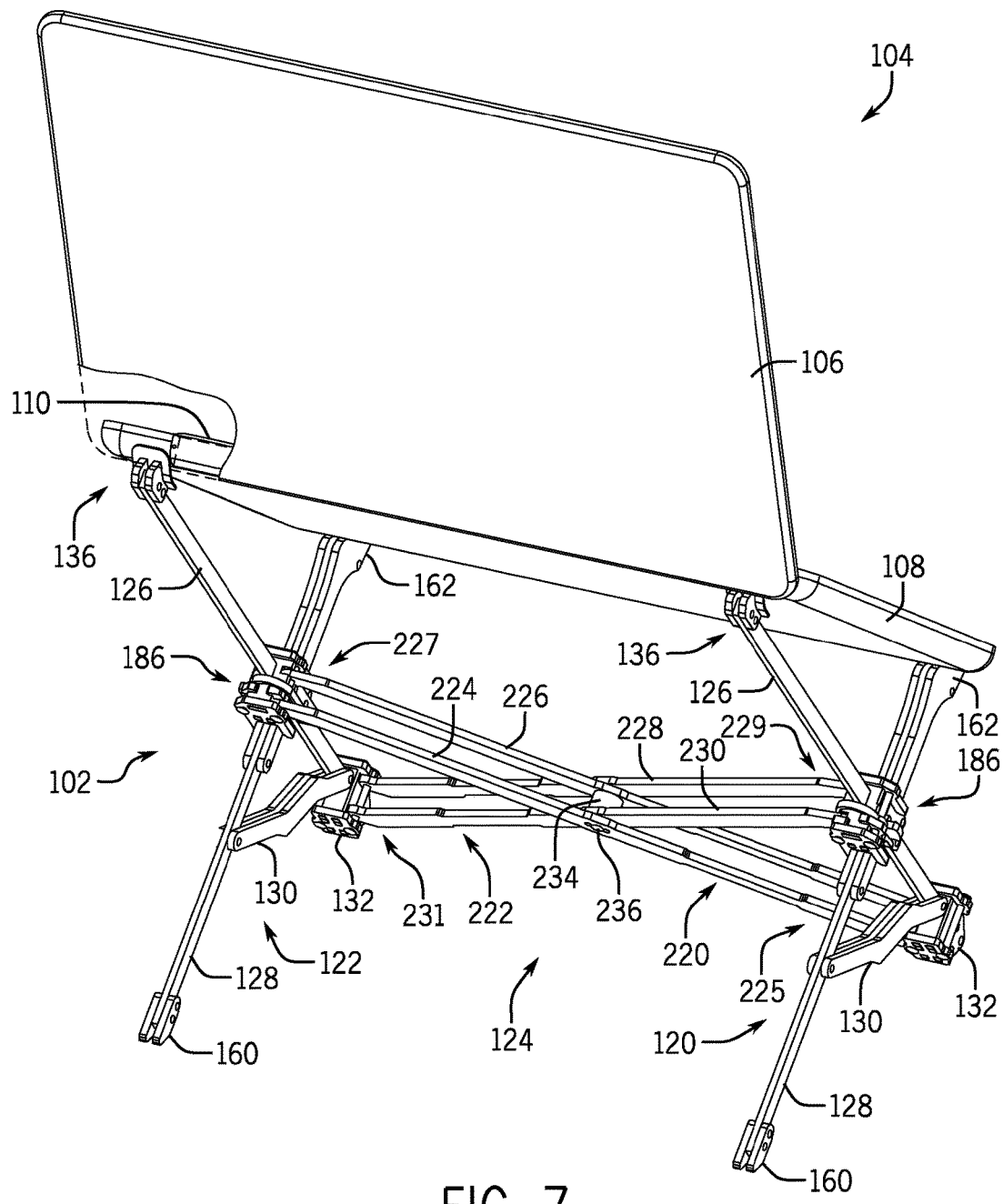
FIG. 7 is a rear isometric view of the stand and laptop computer illustrated in FIG. 1 with a corner portion of the display of the laptop computer removed for clarity.
Figure 8:
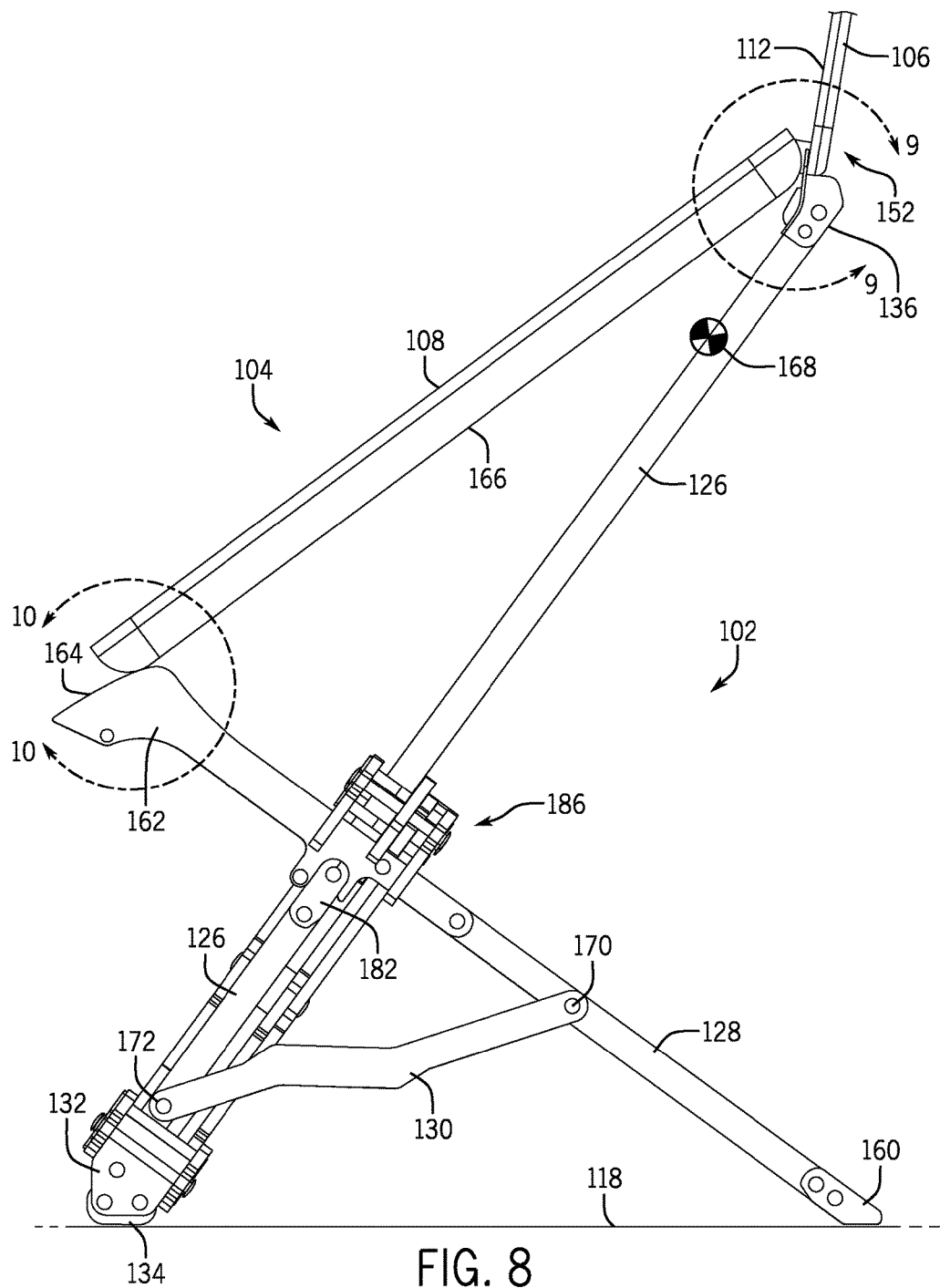
FIG. 8 is a fragmentary, right-side elevation view of the stand and laptop computer illustrated in FIG. 1.
Figure 15:
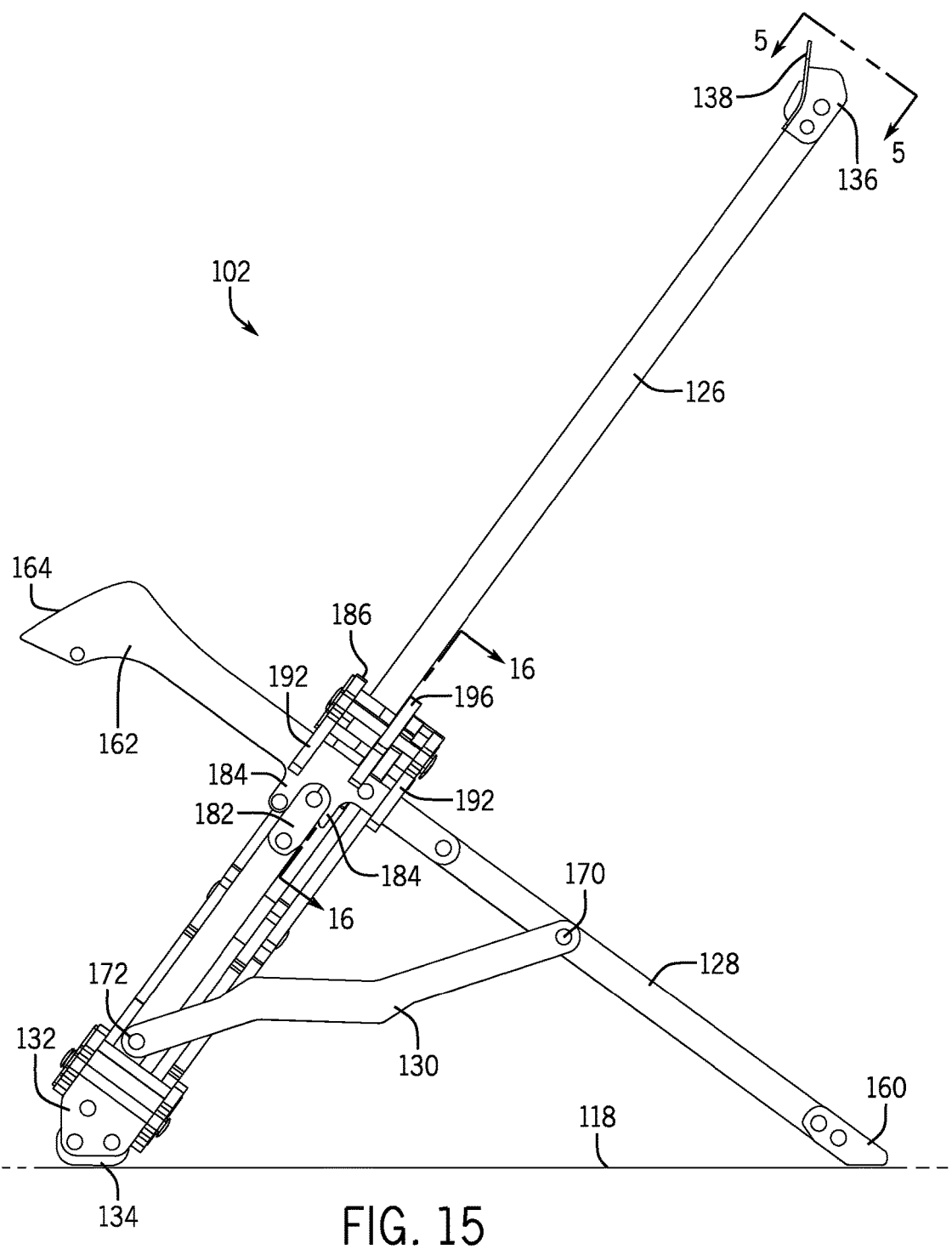
FIG. 15 is a right-side elevation view of the stand illustrated in FIG. 1 in a fully-expanded position.

With reference to FIGS. 5 and 6, when the stand 102 is in a fully-extended position, the elongate arms 126 of the side-frame structures 120, 122 may be positioned in parallel, offset planes as viewed from a front-elevation, rear-elevation, top-plan, or bottom-plan viewpoint. With reference to FIGS. 8 and 15, when the stand 102 is in a fully-extended position, the elongate arms 126 may extend upwardly and rearwardly from the support surface 118 (see FIG. 8) in a common, inclined plane as viewed from a side-elevation viewpoint. As shown in FIGS. 1, 2, 5-8, 15, and 18-20, the elongate arms 126 may remain in these planes during collapse of the stand 102 from the fully-extended position to the fully-collapsed position.

With reference to FIGS. 2, 5-8, and 15, a foot structure 132 may be attached to a lower end of each elongate arm 126. In some implementations, each elongate arm 126 is fixedly secured to the foot structure 132 such that the foot structure 132 is not movable relative to the elongate arm 126. Each foot structure 132 may include a grip element 134 to restrain slippage of the foot structures 132, and thus the stand 102, relative to the support surface 118.

With continued reference to FIGS. 2, 5-8, and 15, a mounting structure or screen catch 136 may be attached to an upper end of each elongate arm 126. With specific reference to FIG. 3, each screen catch 136 may include a tab 138 and opposing securement plates 140. The securement plates 140 may abut against opposing sides of a respective elongate arm 126 and may be secured to the respective arm with one or more fasteners, such as rivets 142. Each securement plate 140 may include a securement knob 144 having an enlarged head 146 and a narrower neck 148. The tab 138 may define a peripherally-bounded aperture 150, which may be sized to snugly receive the necks 148 of the securement plates 140 to attach the tab 138 to the elongate arm 126. The tab 138 may be formed of a resilient material that may be elastically stretched during attachment of the tab 138 to the securement plates 140 to permit enlargement of the aperture 150 during passage of the heads 146 through the aperture 150 and contraction of the aperture 150 around the necks 148 after passage of the heads 146. The mounting structures or screen catches 136 may be referred to as mounting points or end portions of the elongate arms 126.

Figure 9:
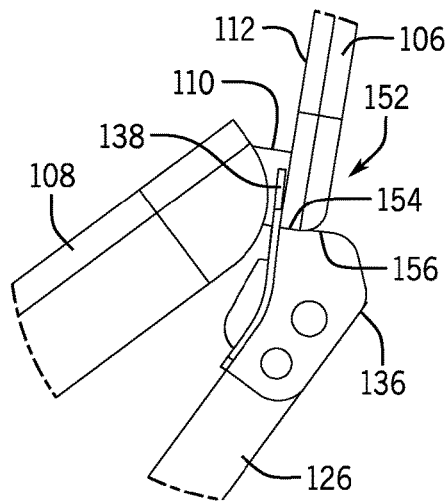
FIG. 9 is an enlarged, detail view of a display catch feature of the stand supporting a display of the laptop computer illustrated in FIG. 1 taken along line 9-9 as shown in FIG. 8.

With reference to FIGS. 7-9 and 11, the screen catches 136 may support the laptop computer 104 along a lower-edge portion 152 of the screen 106 such that the chassis 108 of the laptop may be suspended from the screen 106 by the hinge 110. With specific reference to FIGS. 8 and 9, the screen catches 136 may abut against the inner face 112 and a lower, peripheral edge 154 of the screen 106 to restrain movement of the laptop 104 relative to the stand 102. An upper surface or shoulder 156 of the securement plates 140 may abut against the lower edge 154 of the screen 106 to vertically support the screen 106. The tabs 138 of the screen catches 136 may extend upwardly from the elongate arms 126 and extend between the screen 106 and the chassis 108 of the laptop 104. The tabs 138 may abut against the inner face 112 of the screen 106 to restrain movement of the screen 106 relative to the stand 102. As shown in FIG. 9, in some implementations the elongate arms 126, including the screen catches 136, do not contact the chassis 108 of the laptop 104. Rather, in these implementations, the elongate arms 126 support the screen 106, and the chassis 108 hangs from the screen 106 via the hinge 110. The lower-edge portion 152 of the screen 106 may be referred to as a base, a bottom portion, or a hinge portion of the screen 106.

The elongate arms 126 may bias the screen catches 136 into abutment with the hinge 110 to laterally restrain the laptop 104 to the stand 102. With specific reference to FIG. 11, the tabs 138 may abut against opposing end faces 158 of the hinge 110 to restrain lateral movement of the laptop 104 relative to the stand 102. The tabs 138 may apply a compressive force F to the hinge 110 to further secure the laptop 104 to the stand 102. For example, during insertion of the tabs 138 into the gap between the screen 106 and the chassis 108 (see FIG. 9), a user may need to move the screen catches 136 laterally away from one another to permit the tabs 138 to slide into the gap outwardly of the opposing end faces 158 of the hinge 110. Once the tabs 138 are positioned within the gap, the user may allow the screen catches 136 to move toward one another under the bias of the elongate arms 126 until the tabs 138 abut against the opposing end faces 158 of the hinge 110, at which point the compressive force F of the arms 126 may laterally secure the hinge 110 between the tabs 138 and provide a normal force between the tabs 138 and the opposing end faces 158 of the hinge 110 that resists relative movement between the laptop 104 and the stand 102. The engagement of the tabs 138 and the hinge 110 may ensure the laptop 104 remains secured to the stand 102 in various orientations of the stand 102. The stand 102 may be used with laptops having two or more discrete hinges in a similar manner. For example, the tabs 138 may abut against outwardly-facing end faces of the discrete hinges similar to the illustration in FIG. 11, or the tabs 138 may abut against inwardly-facing end faces of the discrete hinges in which case the arms 126 may apply an expansion force to bias the tabs 138 against the inwardly-facing end faces of the discrete hinges.

With reference to FIGS. 2, 5-8, and 15, a foot structure 160 may be attached to a lower end of each leg 128. In some implementations, each leg 128 is fixedly secured to the foot structure 160 such that the foot structure 160 is not movable relative to the leg 128. Each foot structure 160 may include a grip element to restrain slippage of the foot structures 160 relative to the support surface 118. As shown in FIGS. 2, 7, 8, and 15, when the stand 102 is in a fully-extended position, the foot structures 132, 160 may be spaced apart from one another to provide a broad base with four support surface contact points to prevent or substantially prevent the stand 102 from tipping over when a laptop 104 is mounted onto the stand 102.

Figure 10:
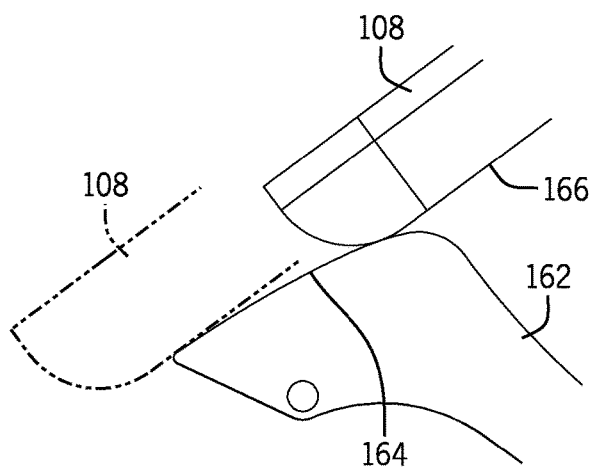
FIG. 10 is an enlarged, detail view of a base abutment feature of the stand abutting against a base of the laptop computer illustrated in FIG. 1 taken along line 10-10 as shown in FIG. 8. The dashed lines are included to indicate the stand may support various base lengths.
Figure 11:
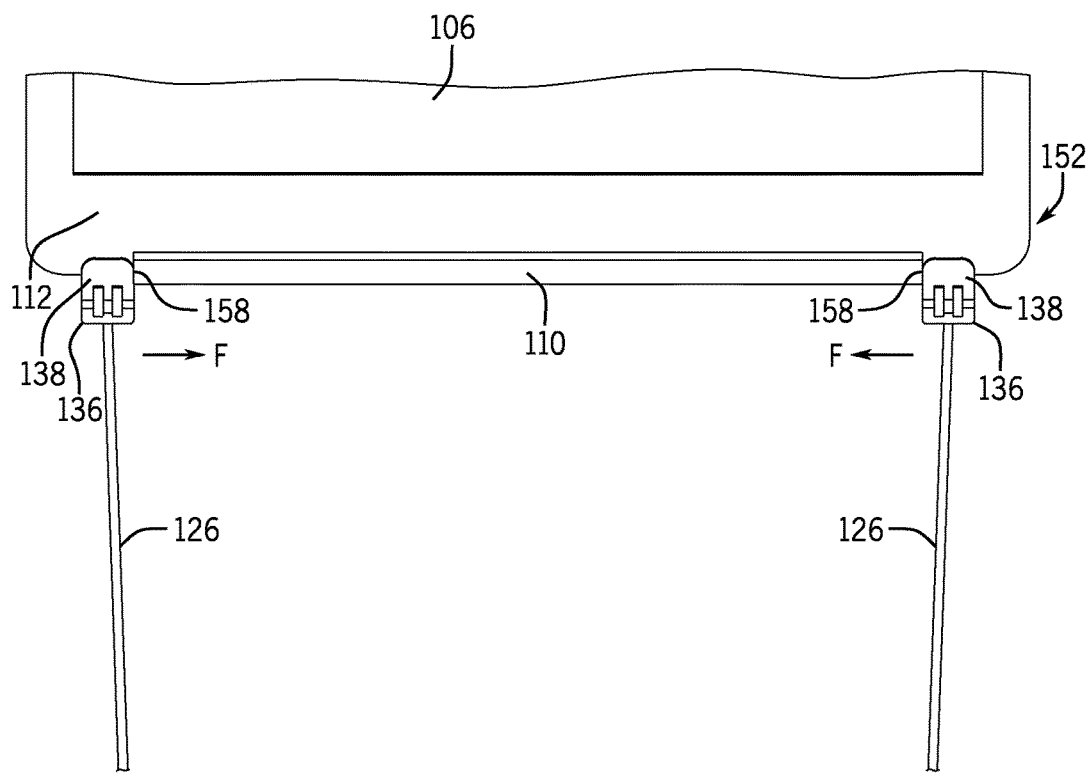
FIG. 11 is an enlarged, detail view of a display catch feature of the stand in engagement with a hinge feature of the laptop computer of FIG. 1 taken along line 11-11 as shown in FIG. 1, with the base of the laptop computer removed for clarity.

With continued reference to FIGS. 2, 5-8, and 15, an upper end of each leg 128 may include a chassis support portion 162. The chassis support portion 162 may include a chassis abutment surface 164 that may abut against a rear or bottom surface 166 of the chassis 108 when the stand 102 is in the fully-extended position and the laptop 104 is suspended from the screen catches 136. In the suspended position (see FIG. 8), the center of gravity 168 of the laptop 104 may be located below the screen catches 136 and rearward of the chassis abutment surfaces 164, thereby creating a pendulum effect in which the base 108 of the laptop 104 swings about the screen catches 136 in a downwardly and rearwardly arcuate motion until the bottom surface 166 of the chassis 108 abuts or rests against the chassis abutment surfaces 164, which may be positioned forwardly of the elongate arms 126. In this suspended position, the shoulder 156 of the screen catches 136 may abut against the lower edge 154 of the screen 106 and the tabs 138 of the screen catches 136 may abut against the inner face 112 of the screen 106 to suspend or hang the laptop 104 from the screen catches 136, and the center of gravity 168 of the laptop 104 may provide a force in a downwardly and forwardly direction from the screen catches 136 to maintain the abutting engagement of the tabs 138 and shoulder 156 of the screen catches 136 with the inner face 112 and lower, peripheral edge 154 of the screen 106, respectively. As shown in FIG. 10, the stand 102 may accommodate various chassis lengths, as represented by the dashed-line representation of a longer chassis 108. The chassis support portions 162 may be referred to as resting points or upper end portions of the legs 128.

Figure 20:
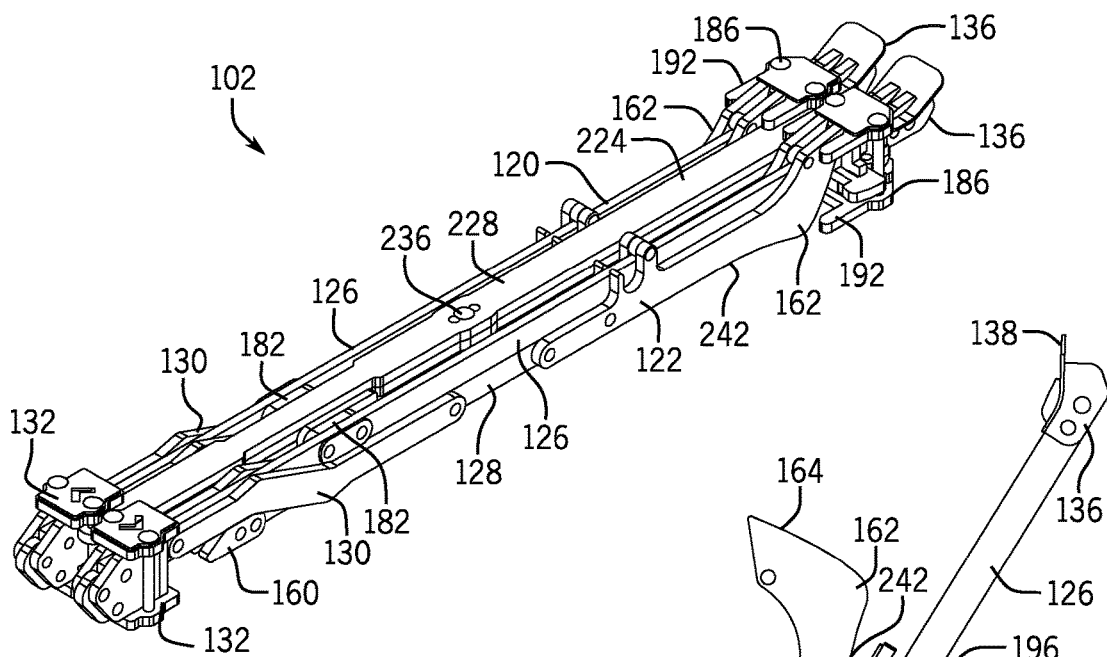
FIG. 20 is an isometric view of the stand illustrated in FIG. 1 in a fully-collapsed position.
Figure 19:
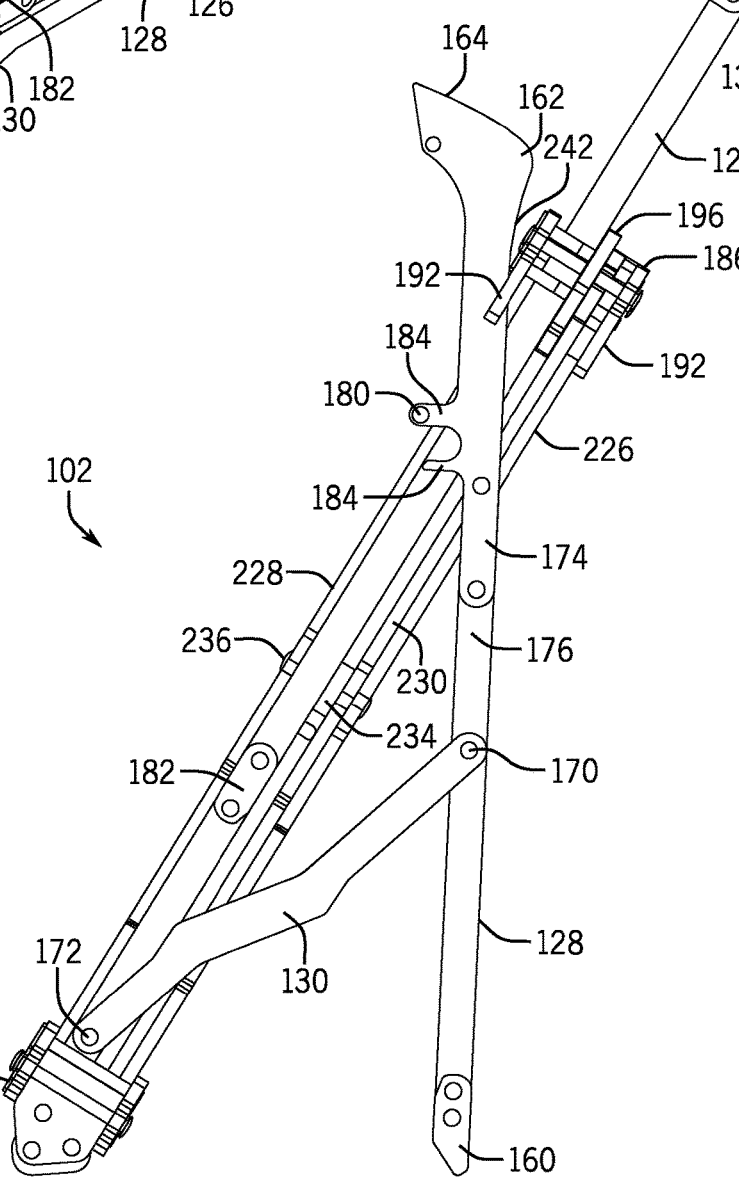
FIG. 19 is a side elevation view of the stand illustrated in FIG. 1 in the partially-collapsed position as shown in FIG. 18.

With reference to FIGS. 15, 19, and 20, the legs 128 of the side-frame structures 120, 122 may be moveable relative to the elongate arms 126. For example, the legs 128 may be rotateably attached to the elongate arms 126. As previously discussed, each leg 128 may be pivotally attached to a respective elongate arm 126 with a cross-link 130. Each cross-link 130 may be pivotally attached to a respective leg 128 intermediate a respective foot structure 160 and a respective chassis support portion 162 with a pivot pin 170, such as a rivet. As such, each leg 128 may be swiveable about a respective pivot pin 170. Each cross-link 130 may be pivotally attached to a respective elongate arm 126 with a pivot pin 172, such as a rivet. As such, each leg 128 may be rotateable about a respective pivot pin 172 and a corresponding portion of the respective elongate arm 126.

With continued reference to FIGS. 15, 19, and 20, the legs 128 of the side-frame structures 120, 122 may be slideable or translateable relative to the elongate arms 126. For example, with reference to FIGS. 12-14, the legs 128 may be slideably attached to the elongate arms 126. Each leg 128 may include an arm receiving portion 174, which may define an internal passage or slot 176 that receives a respective elongate arm 126 and permits the leg 128 to slide along the respective elongate arm 126 in a longitudinal direction of the elongate arm 126. The arm receiving portion 174 of a respective leg 128 may be fixedly attached to a lower end portion 176 of the respective leg 128 by one or more fasteners, for example. As shown in FIGS. 12-14, the arm receiving portions 174 of the legs 128 may include two separate, offset pieces that may be attached to opposing sides of the lower end portion 176 of the leg 128. The offset pieces may define the internal passage 176 therebetween and flank opposing sides of a respective elongate arm 126. The elongate arm 126 may be constrained within the passage 176 between a cross-pin 180 and an upper end of the lower end portion 176 of the leg 128. When the stand 102 is in a fully-collapsed position (see FIG. 20), the elongate arms 126 may be at least partially received between the offset pieces of the arm receiving portions 174 of the legs 128 to provide a more compact, collapsed stand 102.

With reference to FIGS. 5 and 6, when the stand 102 is in a fully-extended position, the legs 128 of the side-frame structures 120, 122 may be positioned in parallel, offset planes as viewed from a front-elevation, rear-elevation, top-plan, or bottom-plan viewpoint. With reference to FIGS. 8 and 15, when the stand 102 is in a fully-extended position, the legs 128 may extend upwardly and forwardly from the support surface 118 (see FIG. 8) in a common plane as viewed from a side-elevation viewpoint. When the stand 102 is in the fully-extended position, the legs 128 may intersect the elongate arms 126 between their respective ends, and the legs 128 may be oriented orthogonally to the elongate arms 126. The legs 128 may rotate and translate relative to the elongate arms 126 during collapse of the stand 102 such that the legs 128 are oriented substantially parallel to the elongate arms 126 when the stand 102 is in the fully-collapsed position (see FIG. 20).

With reference to FIGS. 12-14, the side-frame structures 120, 122 may each include a stop or stopper 182 attached to a respective elongate arm 126 between the foot structure 132 and the screen catch 136. The stopper 182 may be positioned beneath the intersection of the leg 128 and the elongate arm 126 to prevent the leg 128 from moving downwardly along the elongate arm 126 beyond the stopper 182. In other words, the leg 128 of each side-frame structure may intersect a respective elongate arm 126 at a position between the stopper 182 and the screen catch 136. As shown in FIGS. 12-13, the upper end portion 174 of the leg 128 may be snugly received in a space defined between the elongate arm 126 and a portion of the stopper 182, and spaced-apart posts 184 may extend along opposing sides of the stopper 182 to prevent the leg 128 from translating transversely relative to the elongate arm 126. The stopper 182 may include a catch or protrusion 185 oriented transversely to a longitudinal direction of the elongate arms 126.

With continued reference to FIGS. 12-14, a slider or sliding mechanism 186 may be attached to each elongate arm 126. Each slider 186 may be slideable longitudinally along a respective elongate arm 126. The sliders 186 may be positioned along the elongate arms 126 between the legs 128 and the screen catches 136. The stoppers 182 may prevent the sliders 186 from moving downwardly along the elongate arms beyond the stoppers 182.

Figure 17:
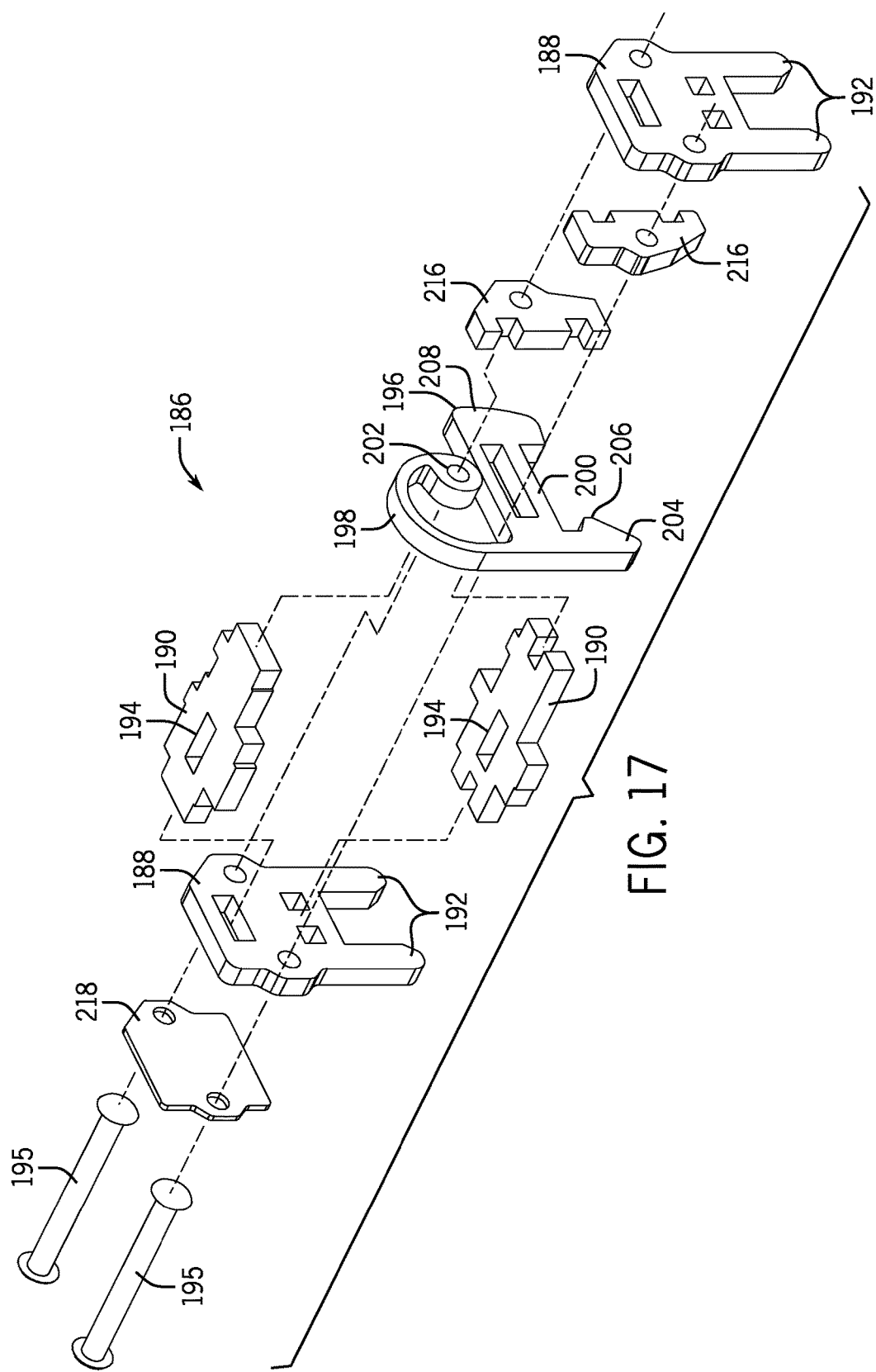
FIG. 17 is an exploded view of a slider feature of the stand illustrated in FIG. 1.

FIG. 17 is an exploded view of an example slider 186. The slider 186 may include leg alignment plates 188 and arm guide plates 190 positioned between and attached to the leg alignment plates 188. The arm guide plates 190 may be oriented orthogonally to the leg alignment plates 188 and may define the spacing between the opposing alignment plates 188. Each leg alignment plate 188 may include a pair of spaced-apart prongs 192 that may extend along opposing sides of a respective leg 128 when the stand is in a fully-extended position (see FIG. 14). Each arm guide plate 190 may include a peripherally-bounded through-hole 194 that receives an elongate arm 126 to guide the slider 186 along the elongate arm 126. The leg alignment plates 188 and the arm guide plates 190 may be secured together with fasteners, such as rivets 195.

Figure 16:
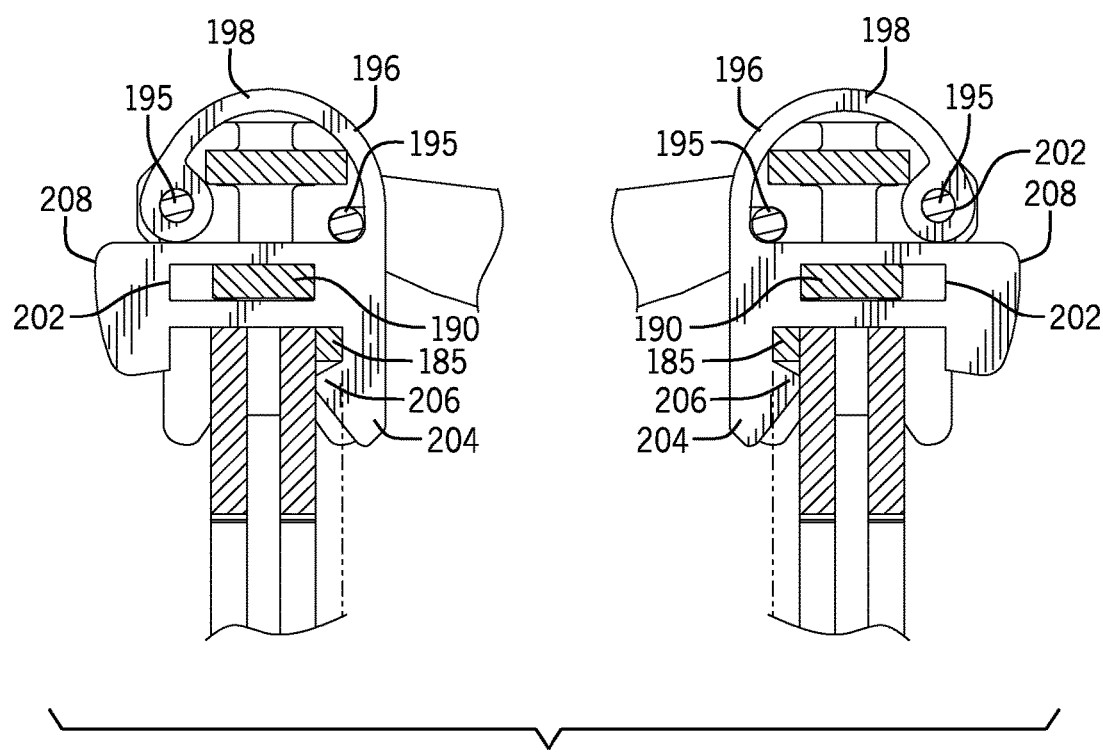
FIG. 16 is a cross-sectional view of a latch feature of the stand illustrated in FIG. 1 taken along the line 16-16 as shown in FIG. 15.

The slider 186 may include a latching or locking element 196 positioned between the opposing leg alignment plates 188. The latching element 196 may include an arcuate or curved, cantilevered finger 198 attached at one end to a first side of a body portion 200 of the locking element 196. The finger 198 may extend upwardly from the body portion 200 and extend laterally above the body portion 200 toward an opposing side of the body portion 200. The finger 198 may terminate at a free end, which may define a peripherally-bound aperture 202 that receives one of the rivets 195. A latch 204 may be attached to the first side of the body portion 200 and extend in an opposite direction from the body portion 200 relative to the finger 198. The latch 204 may include a barb 206 positioned beneath the body portion 200 of the locking element 196 and pointed inwardly toward the opposing side of the body portion 200. A button 208 may be formed along the second side of the body portion 200. The body portion 200 may define a centrally-located aperture 210 which receives a portion of one of the arm guide plates 190. The aperture 210 may correspond in height to the portion of the arm guide plate 190, but the aperture 210 may be oversized in width relative to the portion of the arm guide plate 190 to permit lateral, but not vertical, displacement of the locking element 196 relative to the arm guide plate 190 (see FIG. 16). The slider 186 may include one or more spacers 216 positioned between the locking element 196 and one of the leg alignment plates 188. The slider 186 may include a cover plate 218 attached to an outwardly-facing surface of one of the leg alignment plates 188.

With reference to FIGS. 2, 5-7, and 18, the cross-frame structure 124 of the stand 102 may include a first pair 220 of elongate, offset cross-frame members 224, 226 and a second pair 222 of elongate, offset cross-frame members 228, 230. The first pair 220 of cross-frame members 224, 226 may be pivotally attached at a lower end 225 to the first side-frame structure 120 and pivotally attached at an upper end 227 to the second side-frame structure 122 (see FIG. 6). The second pair 222 of cross-frame members 228, 230 may be pivotally attached at an upper end 229 to the first side-frame structure 120 and pivotally attached at a lower end 231 to the second side-frame structure 122 (see FIG. 6). The cross-frame members 224, 226, 228, 230 may form a scissor mechanism that folds from the fully-extended position (see FIG. 6) to the fully-collapsed position (see FIG. 20) and unfolds from the fully-collapsed position to the fully-extended position.

With continued reference to FIGS. 2, 5-7, and 18, the lower ends 225, 231 of the first and second pairs 220, 222 of cross-frame members 224, 226, 228, 230 may be pivotally attached to the opposing foot structures 132. The pivotal attachment may permit the first and second pairs 220, 222 of cross-frame members 224, 226, 228, 230 to move about one rotational degree of freedom and restrain movement about the other five degrees of freedom (three translation degrees of freedom and two rotational degrees of freedom) relative to the foot structures 132. As previously discussed, the foot structures 132 may be fixedly secured to a respective elongate arm 126. As such, the lower ends 225, 231 of the first and second pairs 220, 222 of cross-frame members 224, 226, 228, 230 may be non-translateable relative to the elongate arms 126.

With continued reference to FIGS. 2, 5-7, and 18, the upper ends 227, 229 of the first and second pairs 220, 222 of cross-frame members 224, 226, 228, 230 may be pivotally attached to the opposing sliders 186. The pivotal attachment may permit the first and second pairs 220, 222 of cross-frame members 224, 226, 228, 230 to move about one rotational degree of freedom and restrain movement about the other five degrees of freedom (three translation degrees of freedom and two rotational degrees of freedom) relative to the sliders 186. The pivot axes of the upper and lower ends 225, 227, 229, 231 may be parallel to one another.

As previously discussed, the sliders 186 may be slideably attached to the elongate arms 126 such that the sliders 186 may slide longitudinally along the elongate arms 126 between the screen catches 136 and the stoppers 182. Thus, the upper ends 227, 229 of the first and second pairs 220, 222 of cross-frame members 224, 226, 228, 230 may be translateable longitudinally along the elongate arms 126 relative to the lower ends 225, 231 of the first and second pairs 220, 222 of cross-frame members 224, 226, 228, 230. With reference to FIGS. 6, 15, and 18-20, the upper ends 227, 229 of the first and second pairs 220, 222 of cross-frame members 224, 226, 228, 230 may be slideably attached to the first and second side-frame structures such that the upper ends 227, 229 move away from the lower ends 225, 231, respectively, during collapse of the stand 102 from the fully-extended position (see FIGS. 6 and 15) to the fully-collapsed position (see FIG. 20).

With continued reference to FIGS. 2, 5-7, and 18, the first and second pairs 220, 222 of cross-frame members 224, 226, 228, 230 may form a torsionally-stiff box structure. As previously discussed, the pivotal attachment of the ends 225, 227, 229, 231 of the first and second pairs 220, 222 of cross-frame members 224, 226, 228, 230 may permit in-plane movement of the cross-frame members such that the stand 102 may be collapsed and extended between fully-collapsed and fully-extended positions. The pivotal attachment of the ends 225, 227, 229, 231 of the first and second pairs 220, 222 of cross-frame members 224, 226, 228, 230 may prevent or substantially prevent out-of-plane movement of the cross-frame members such that the foot structures 132, 160, the screen catches 136, and the chassis support portions 162 may be held in fixed relationship to one another upon locking the in-plane movement of the cross-frame members, thereby creating a rigid frame structure that securely supports the laptop computer 104. The offset configuration of the cross-frame members 224, 226, 228, 230 may increase the bending and torsional stiffness of the cross-frame structure 124, thereby strengthening the out-of-plane rigidity of the frame structure while not effecting the in-plane movement of the cross-frame members. As such, the offset cross-frame members 224, 226, 228, 230 and their pivotal attachment to the side-frame structures 120, 122 may create a rigid and strong, yet lightweight, cross-frame structure 124.

With reference to FIGS. 12-14, the stand 102 may be lockable in a fully-extended position. In some implementations, the upper ends 227, 229 of the first and second pairs 220, 222 of cross-frame members 224, 226, 228, 230 may be lockable to the first and second side-frame structures 120, 122 to prevent the upper ends 227, 229 from moving relative to the lower ends 225, 231, respectively. The legs 128 may intersect the elongate arms 126 at a position between the stoppers 182 and the upper ends 227, 229 of the cross-frame members 224, 226, 228, 230. As previously discussed, the upper ends 227, 229 of the cross-frame members 224, 226, 228, 230 may be attached to sliders 186, which may include a latching element 196. To lock the stand 102 in a fully-extended position, the legs 128 may be rotated relative to the pivot pin 170 and translated relative to the elongate arm 126 such that the spaced-apart posts 184 extend along opposing sides of the stopper 182 (see FIGS. 12 and 13 in sequence). The sliders 186 may be translated longitudinally along the elongate arms 126 away from the screen catches 136 until the sliders 186 abut against a rear edge 242 of the legs 128, at which point the prongs 192 of the sliders 186 may abut against opposing sides of the legs 128 and the latches 204 of the sliders 186 may engage the catches 185 of the stoppers 182 to lock the legs 128 in a fully-extended position relative to the elongate arms 126 (see FIGS. 12 and 13 in sequence, with reference to FIGS. 16 and 17).

With reference to FIGS. 5, 6, 15, and 16, once the stand 102 is in the fully-extended, locked position, a user may push the buttons 208 inwardly to disengage the latches 204 from the catches 185 and push the sliders 186 upwardly along the elongate arms 126 away from the stoppers 182. With specific reference to FIG. 16, as the free end of the arcuate or curved finger 198 may be fixed in place by a rivet 195, the inwardly movement of the button 208 may cause the finger 198 to elastically deform and store potential energy within the finger 198. Upon a user removing the force applied to the buttons 208, the potential energy of the finger 198 may be converted into kinetic energy and return the latching element 196 to its original position. Thus, the latching element 196 may automatically reset itself into a latching position.

Figure 18:
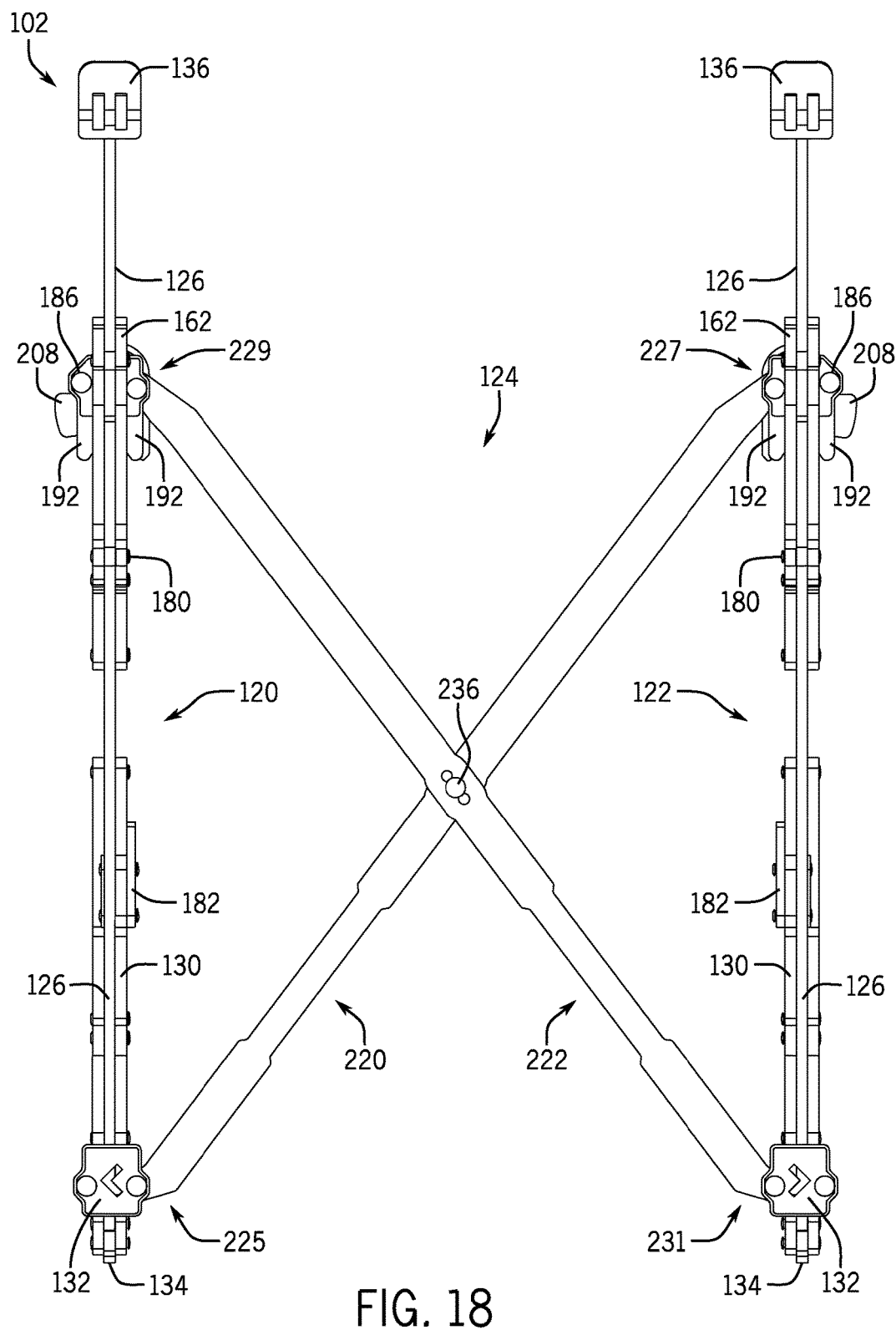
FIG. 18 is a front elevation view of the stand illustrated in FIG. 1 in a partially-collapsed position.

With reference to FIGS. 2, 4-7, and 18, the first and second pairs 220, 222 of cross-frame members 224, 226, 228, 230 may be pivotally attached to one another intermediate the upper ends 227, 229 and the lower ends 225, 231. A spacer 234 may be positioned between the first pair 220 of cross-frame members 224, 226 as well as between the second pair 222 of cross-frame members 228, 230 to maintain a consistent or substantially consistent spacing between the cross-frame members 224, 226, 228, 230 from the lower ends 225, 231 to the upper ends 227, 229. In some implementations a fastener, such as a rivet 236, may extend through aligned apertures formed in the cross-frame members 224, 226, 228, 230 and through an inner bore of the spacer 234 to attach the cross-frame members together intermediate the upper ends 227, 229 and the lower ends 225, 231. The offset cross-frame members 224, 226, 228, 230 may create a rigid and strong, yet lightweight, cross-frame structure. The cross-frame structure 124 may be collapsible into a compact, nested configuration in which the cross-frame members 224, 226, 228, 230 are oriented parallel to one another (see FIG. 20). The cross-frame structure 124 may maintain the side-frame structures 120, 122 in parallel relationship to one another during expansion and contraction, thereby facilitating use of the stand 102. As shown in FIGS. 6, 18, and 20, the cross-frame members 224, 226, 228, 230 may form a scissor mechanism that folds from an extended position (see FIG. 6) into a collapsed position (see FIG. 20), while keeping the arms 126 parallel to one another.

Figure 4:
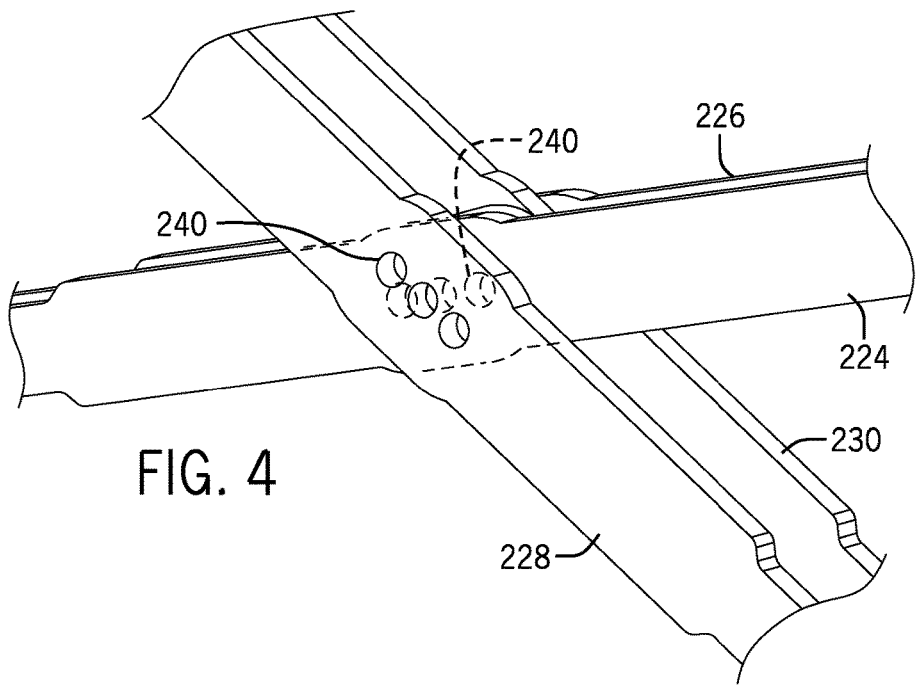
FIG. 4 is an enlarged, detail view of a width adjustment feature of the stand illustrated in FIG. 1 taken along line 4-4 as shown in FIG. 2, with the fastener removed for clarity.

With reference to FIGS. 2, 4, 6, 7, and 18, the stand 102 may be adjustable in width to accommodate various sizes of computing devices, such as the laptop 104. Each cross-frame member 224, 226, 228, 230 may define a series of transversely-extending through-holes 240. The through-holes 240 may be spaced apart from one another longitudinally along the cross-frame members 224, 226, 228, 230 to provide adjustability to the width of the cross-frame structure 124. As shown in FIGS. 4 and 5, respective ones of the through-holes 240 may be aligned with one another and a fastener, such as the rivet 236, may be extend through the holes 240 to set the width of the cross-frame structure. The spacing of the through-holes 240 may adjust the width of the stand 102 to correspond to standard screen 106 sizes, such as thirteen, fifteen, or seventeen inches. By adjusting the width of the cross-frame structure 124, the lateral distance between the chassis abutment surfaces 164 and between the screen catches 136 may be correspondingly adjusted.

In some implementations, the distance between a respective chassis abutment surface 164 and a respective screen catch 136 may be adjustable. For example, the stoppers 182 may be adjustably attached to the elongate arms 126 to permit the stoppers 182 to be translated along the length of the elongate arms 126 and then secured in place. Adjusting the position of the stoppers 182 relative to the elongate arms 126 may adjust the angle of the legs 128 relative to the arms 126 when the stand 102 is in a fully-extended position, resulting in movement of the chassis abutment surfaces 164 relative to the screen catches 136. A ball detent or other suitable attachment mechanism may be used to adjustably attach the stopper 182 to the elongate arm 126. In some implementations, the chassis support portion 162 of the legs 128 may be pivotally attached to a remainder portion of the legs 128 to adjust the distance between a respective chassis abutment surface 164 and a respective screen catch 136. A ratchet mechanism or other suitable attachment mechanism may be used to attach the chassis support portion 162 to the remainder portion of the leg 128.

To expand the stand 102 from the fully-collapsed position shown in FIG. 20 to the fully-extended position shown in FIGS. 1, 2, 5-8, and 15, a user may grip the foot structures 132 and pull the foot structures 132 away from one another. As the foot structures 132 are pulled away from one another, the upper ends 227, 229 of the cross-frame members 224, 226, 228, 230 may move towards the lower ends 225, 231, thereby translating the sliders 186 downwardly along the elongate arms 126 from the screen catches 136 toward the stoppers 182. During this downward motion, the sliders 186 may abut against a rear edge 242 of the legs 128 (see FIGS. 19 and 20) and drive the legs 128 in a translating, rotational motion toward the stoppers 182. To complete the extension and lock the stand 102 in the fully-extended position, a user may apply a downward force to the sliders 186 until the latches 204 engages the catches 185.

To attach the laptop 104 to the stand 102, a user may position the stand 102 onto a support surface 118 such that the foot structures 132, 160 are abutted against the support surface 118 in a common plane. The user may position a computing device, such as a laptop 104, over the stand 102 and align the gap between the screen 106 and the chassis 108 with the screen catches 136. The user may move the laptop 104 downwardly such that the screen catches 136 slide into the gap between the screen 106 and the chassis 108 of the laptop 104. To facilitate insertion of the screen catches 136 into the hinge gap, the user may want to insert one of the screen catches 136 into the gap and then insert the other of the screen catches 136 into the gap, which may require resilient bending of the elongate arms 126 such that the screen catches 136 fit inwardly or outwardly of the hinge 110 of the laptop 104. When positioned on the screen catches 136, the screen 106 may rest firmly on the shoulders 156 of the screen catches 136 (see FIG. 9). The chassis 108 of the laptop 104 may swing downwardly and abut against the chassis abutment surfaces 164 due to the location of the center of gravity 168 of the laptop 104 relative to the mounting points or screen catches 136 (see FIG. 8). To remove the laptop 104 from the stand 102, a user may lift the laptop 104 upwardly from the stand 102. To facilitate removal, the user may tilt the laptop screen 106 slightly towards the chassis 108 to enlarge the gap between the screen 106 and the chassis 108.

To collapse the stand 102 from the fully-extended position shown in FIGS. 1, 2, 5-8, and 15 to the fully-collapsed position shown in FIG. 20, a user may unlock the stand 102 by pushing inwardly on the release buttons 208. The user also may push upwardly on the release buttons 208 to move the sliders 186 upwardly along the elongate arms 126 away from the stoppers 182. After releasing the latch 204, the user may collapse the stand 102 by pushing inwardly on the opposing side-frame structures 120, 122 until the cross-frame structure 124 and the side-frame structures 120, 122 are positioned adjacent to one another in parallel relationship. The user may push upwardly on the chassis support portion 162 of the legs 128 to rotate and translate the legs 128 relative to the elongate arms 126 until the legs 128 are positioned parallel to the arms 126. As shown in FIG. 20, when the stand 102 is in the fully-collapsed position, the cross-frame structure 124 may be flanked on opposing sides by the side-frame structures 120, 122.

The stand may be made of various materials. For example, the stand may be made of high-strength plastic, carbon fiber, aluminum, or any other sufficiently rigid, strong, and lightweight material. In one implementation, the support arms are made of carbon fiber, the legs are made partially of carbon fiber and partially of polyoxymethylene (also known as acetal, polyacetal, and polyformaldehyde), and the cross-members are made of polyoxymethylene.

The foregoing description has broad application. While the provided figures illustrate a stand including a pair of spaced-apart arms that support a laptop screen, in some implementations the stand may include more or less than two arms. For example, in implementations designed for use with laptops having two or more discrete hinges, the stand may include a single arm that includes a screen catch that extends between the discrete hinges. The screen catch may abut against opposing, inwardly-facing end faces of the discrete hinges to secure the laptop to the stand. Further, while the provided figures illustrate a stand in conjunction with a laptop computer, the stand may be used in conjunction with other computing devices having a gap or recess capable of receiving a tab so as to suspend a portion of the computing device from the stand. Accordingly, the discussion of any example is meant only to be explanatory and is not intended to suggest that the scope of the disclosure, including the claims, is limited to these examples. In other words, while illustrative examples of the disclosure have been described in detail herein, it is to be understood that inventive concepts may be otherwise variously embodied and employed, and that the appended claims are intended to be construed to include such variations, except as limited by the prior art.

All directional references (e.g., upper, lower, upward, downward, left, right, leftward, rightward, top, bottom, above, below, inner, outer, vertical, horizontal, clockwise, and counterclockwise) are only used for identification purposes to aid the reader's understanding of the examples of the invention, and do not create limitations, particularly as to the position, orientation, or use of the invention unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and/or in fixed relation to each other. Identification references (e.g., first, second, third, fourth, etc.) are not intended to connote importance or priority, but are used to distinguish one feature from another.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. For example, although the provided figures illustrate a stand including both a collapsible frame and a screen catch feature, example stands may include a collapsible frame without the screen catch feature or a fixed frame with a screen catch feature. It should be understood that various features of the certain aspects, embodiments, or configurations of the disclosure may be combined in alternate aspects, embodiments, or configurations. In methodologies directly or indirectly set forth herein, various steps and operations are described in one possible order of operation, but those skilled in the art will recognize that steps and operations may be rearranged, replaced, or eliminated or have other steps inserted without necessarily departing from the spirit and scope of the present disclosure. Moreover, the following claims are hereby incorporated into this Detailed Description by this reference, with each claim standing on its own as a separate embodiment of the present disclosure.

What is claimed is:

1. A stand for supporting a mobile computing device above a support surface, the stand comprising:
    a first side-frame structure including a first elongate frame member, a second elongate frame member, and a first cross-link member pivotally attached at a first end to the first elongate frame member and at a second end to the second elongate frame member, wherein the second elongate frame member defines a first internal passage through which the first elongate frame member slideably passes, wherein the first and second elongate frame members intersect each other between their respective ends when the stand is in a fully-extended position, and wherein the first internal passage extends beyond the intersection of the first and second elongate frame members when the stand is in the fully-extended position to allow the second elongate frame member to pivot relative to the first elongate frame member during collapse of the stand from the fully-extended position to a fully-collapsed position;

a second side-frame structure including a third elongate frame member, a fourth elongate frame member, and a second cross-link member pivotally attached at a first end to the third elongate frame member and at a second end to the fourth elongate frame member, wherein the fourth elongate frame member defines a second internal passage through which the third elongate frame member slideably passes, wherein the third and fourth elongate frame members intersect each other between their respective ends when the stand is in the fully-extended position, and wherein the second internal passage extends beyond the intersection of the third and fourth elongate frame members when the stand is in the fully-extended position to allow the fourth elongate frame member to pivot relative to the third elongate frame member during collapse of the stand from the fully-extended position to the fully-collapsed position; and a collapsible structure positioned between and attached to the first and second side-frame structures.

2. The stand of claim 1, wherein:
the first cross-link member extends beneath the intersection of the first and second elongate frame members when the stand is in the fully-extended position; and
the second cross-link member extends beneath the intersection of the third and fourth elongate frame members when the stand is in the fully-extended position.

3. The stand of claim 1, wherein:
the first side-frame structure further includes a first stop associated with the first and second elongate frame members; and
the second side-frame structure further includes a second stop associated with the third and fourth elongate frame members.

4. The stand of claim 1, wherein:
the first side-frame structure further includes a first resilient material attached to an upper end of the first elongate frame member; and
the second side-frame structure further includes a second resilient material attached to an upper end of the third elongate frame member.

5. The stand of claim 1, wherein lower ends of the first, second, third, and fourth elongate frame members are disposed in a common plane when the stand is in the fully-extended position.

6. The stand of claim 1, wherein:
the first and second elongate frame members are disposed in a first plane;
the third and fourth elongate frame members are disposed in a second plane; and
the first and third elongate frame members are disposed in a third plane oriented substantially perpendicular to the first and second planes.

7. The stand of claim 6, wherein:
the collapsible structure is oriented substantially parallel to the third plane.

8. The stand of claim 1, wherein the collapsible structure is oriented substantially co-planar with the first and third elongate frame members.

9. The stand of claim 1, wherein the collapsible structure comprises:
a first cross-frame member pivotally attached at a first end to the first elongate frame member and at a second end to the third elongate frame member; and
a second cross-frame member pivotally attached at a first end to the third elongate frame member and at a second end to the first elongate frame member.

10. The stand of claim 9, wherein the first and second cross-frame members are pivotally attached to each other intermediate their respective ends.

11. The stand of claim 9, wherein the second ends of the first and second cross-frame members are slideable along a length of the third and first elongate frame members, respectively.

12. The stand of claim 11, further comprising:
a first latching element associated with the second end of the first cross-frame member to restrict the second end of the first cross-frame member from sliding along the length of the third elongate frame member; and
a second latching element associated with the second end of the second cross-frame member to restrict the second end of the second cross-frame member from sliding along the length of the first elongate frame member.

* * * * *